(12) United States Patent
Muto

(10) Patent No.: US 7,477,220 B2
(45) Date of Patent: Jan. 13, 2009

(54) THREE-DIMENSIONAL LIQUID CRYSTAL DISPLAY DEVICE

(75) Inventor: Tetsuo Muto, Hachioji (JP)

(73) Assignee: Casio Computer, Co., Ltd., Tokyo (JP)

( * ) Notice: Subject to any disclaimer, the term of this patent is extended or adjusted under 35 U.S.C. 154(b) by 895 days.

(21) Appl. No.: 10/874,570

(22) Filed: Jun. 23, 2004

(65) Prior Publication Data
US 2004/0263451 A1    Dec. 30, 2004

(30) Foreign Application Priority Data
Jun. 24, 2003   (JP)   ............... 2003-179668

(51) Int. Cl.
G09G 3/36    (2006.01)
(52) U.S. Cl. ............... 345/87; 345/6; 345/32; 345/38; 345/55
(58) Field of Classification Search ............ 345/6, 345/32, 38, 87, 55
See application file for complete search history.

(56) References Cited

U.S. PATENT DOCUMENTS

| | | | |
|---|---|---|---|
| 6,108,058 A | 8/2000 | Uchida | |
| 6,582,091 B2 * | 6/2003 | Funamoto et al. | 362/601 |
| 6,876,495 B2 * | 4/2005 | Street | 359/622 |
| 7,133,019 B2 | 11/2006 | Ogiwara et al. | |

FOREIGN PATENT DOCUMENTS

| | | |
|---|---|---|
| JP | 3-119889 A | 5/1991 |
| JP | 7-5455 A | 1/1995 |
| JP | 10-253808 A | 9/1998 |
| JP | 10-268230 A | 10/1998 |
| JP | 11-014988 A | 1/1999 |
| JP | 2001-066547 A | 3/2001 |
| JP | 2002-023163 A | 1/2002 |
| JP | 2002-107833 A | 4/2002 |

OTHER PUBLICATIONS

Japanese Office Action (and English translation thereof) dated Aug. 5, 2008, issued in a counterpart Japanese Application.

\* cited by examiner

*Primary Examiner*—Richard Hjerpe
*Assistant Examiner*—Leonid Shapiro
(74) *Attorney, Agent, or Firm*—Frishauf, Holtz, Goodman & Chick, P.C.

(57) ABSTRACT

On a side opposite to an observation side of a liquid crystal display panel, a plane light source is disposed which emits an illuminative light for the left eye of three colors of red, green and blue having such a directivity that a peak of emitted light intensity exists in a direction of the observer's left eye, and that for the right eye of three colors of red, green and blue having such a directivity that the peak of emitted light intensity exists in a direction of the right eye. A control unit selects unit color image data of three colors of red, green and blue for the left eye and that of three colors of red, green and blue for the right eye in an optional order to successively write the data in each pixel of the liquid crystal display panel in one frame for displaying a three-dimensional image including images for the right and left eyes, so that an illuminative light having color and directivity corresponding to the written unit color image data is emitted from the plane light source in synchronization with the writing of the unit color image data.

16 Claims, 6 Drawing Sheets

THREE-DIMENSIONAL LIQUID CRYSTAL DISPLAY DEVICE

CROSS-REFERENCE TO RELATED APPLICATIONS

This application is based upon and claims the benefit of priority from prior Japanese Patent Application No. 2003-179668, filed Jun. 24, 2003, the entire contents of which are incorporated herein by reference.

BACKGROUND OF THE INVENTION

1. Field of the Invention

The present invention relates to a liquid crystal display device which displays a three-dimensional color image.

2. Description of the Related Art

There has heretofore been a liquid crystal display device which displays a three-dimensional image. In the device, an image for the left eye is displayed every other row of pixels of a liquid crystal display panel, and an image for the right eye is displayed every remaining other row of pixels. The images for the right and left eyes are observed by the observer's right and left eyes via a lenticular lens or a parallax barrier. The lenticular lens distributes emitted light from one line of pixels and that from the other line of pixels of the liquid crystal display panel in the observer's right and left eye directions. The parallax barrier has a plurality of transmitting and interrupting portions which are alternately arranged in parallel with the pixel line of the liquid crystal display panel and formed in stripes. The above technic are described in for example, Jpn. Pat. Appln. KOKAI Publication Nos. 03-11889, 07-5455, and 10-268230.

Since the image for the left eye is displayed by the pixels every other row, and the image for the right eye is displayed by the pixels every remaining other row of the liquid crystal display panel in the liquid crystal display device for displaying the three-dimensional images, both the images have low resolution.

Additionally, in the conventional liquid crystal display device, lens portions of the lenticular lens having a lens pitch corresponding to the pixel pitch of the liquid crystal display panel, or transmitting portions of the parallax barrier having a transmitting portion pitch corresponding to the pixel pitch have to be disposed for the pixels of the respective lines of the liquid crystal display panel with a predetermined positional relationship and with good precision. Therefore, it has been difficult to manufacture the device.

BRIEF SUMMARY OF THE INVENTION

An object of the present invention is to provide a liquid crystal display device which is capable of displaying a three-dimensional color image having a high resolution and which can be easily manufactured.

To achieve the above-described object, according to a first aspect of the present invention, there is provided a three-dimensional liquid crystal display device comprising:

a liquid crystal display panel including a plurality of pixels arranged in a matrix form, these pixels selectively displaying images for the right and left eyes for observation separately with the right and left eyes;

a plane light source which is disposed on a side opposite to an observation side of the liquid crystal display panel and which emits a first illuminative light having such a directivity that a peak of an emitted light intensity exists in a first direction inclined at an angle in a direction of one of the observer's right and left eyes with respect to a normal line of the liquid crystal display panel, and a second illuminative light having such a directivity that a peak of an emitted light intensity exists in a second direction inclined at an angle in a direction of the other observer's eye with respect to the normal line toward the liquid crystal display panel; and control means for successively selecting image data for the left eye for displaying the image for the left eye and image data for the right eye for displaying the image for the right eye to write the data into each pixel of the liquid crystal display panel and for selectively emitting the first and second illuminative light having the directivities corresponding to the data for the right and left eyes written in the respective pixels of the liquid crystal display panel among the first and second illuminative lights from the plane light source in synchronization with the display of the liquid crystal display panel by the writing of the image data.

According to the three-dimensional liquid crystal display device, the liquid crystal display panel which selectively displays the images for right and left eyes for the observation separately with the right and left eyes, and the plane light source which emits the first and second illuminative lights having such directivities that the peaks of the emitted light intensities exist in the directions of the observer's right and left eyes are used. In accordance with the display of the right/left image of the liquid crystal display panel, the first or second illuminative light is selected from the plane light source, and applied onto the liquid crystal display panel. Therefore, since all the pixels of the liquid crystal display device are used to display an image, a three-dimensional color image having a high resolution can be displayed, and further the device can be easily manufactured.

In this three-dimensional liquid crystal display device, the plane light source comprises: at least two light emitting elements; a light guide plate which guides at least two lights produced by these light emitting elements to emit the light toward different directions inclined with respect to the normal line of a light guide plate surface; and a collimating film which emits one of the lights emitted toward the respective different directions from the light guide plate as the first illuminative light toward the first direction and which emits the other light as the second illuminative light toward the second direction. Furthermore, the light guide plate comprises a plate-like transparent member including first and second incidence end surfaces which are formed on end surfaces of a transparent material, facing each other and upon which the light is incident, and an emission surface to emit the light which is incident upon the first and second incidence end surfaces and which is guided in the transparent member in mutually different directions. The light emitting element comprises first and second light emitting elements which are disposed on the first and second incidence end surfaces of the light guide plate to face each other and which selectively emit the light toward the incidence end surface. The collimating film preferably comprises an optical film which is disposed on the emission surface of the light guide plate and which emits the light incident upon the light guide plate via the first incidence end surface and emitted from the emission surface as a first illuminative light having such a directivity that a peak of emitted light intensity exists in a first direction and which emits the light incident upon the light guide plate via the second incidence end surface and emitted from the emission surface as a second illuminative light having such a directivity that a peak of emitted light intensity exists in a second direction.

According to a second aspect of the present invention, there is provided a three-dimensional liquid crystal display device comprising:

a liquid crystal display panel including a plurality of pixels arranged in a matrix form, in these pixels, color image data of three colors of red, green and blue in color images for right and left eyes for observation separately with the right and left eyes being selectively written, the panel selectively displaying color images of three colors of red, green and blue in the color images for the right and left in accordance with the color image data for the right and left eyes;

a plane light source which is disposed on a side opposite to an observation side of the liquid crystal display panel and which emits a first illuminative light of three colors of red, green and blue, having such a directivity that a peak of an emitted light intensity exists in a first direction inclined at a predetermined angle in a direction of one of observer's right and left eyes with respect to a normal line of the liquid crystal display panel, and a second illuminative light of three colors of red, green and blue, having such a directivity that a peak of an emitted light intensity exists in a second direction inclined at a predetermined angle in a direction of the other observer's eye with respect to the normal line toward the liquid crystal display panel; and control means for selecting unit color image data of three colors of red, green and blue for displaying the color image for the left eye, and unit color image data of three colors of red, green and blue for displaying the color image for the right eye in a predetermined optional order to write the data in pixels of the liquid crystal display panel in a frame for displaying a three-dimensional image comprising the color images for the right and left eyes, and for emitting an illuminative light having color and directivity corresponding to the unit color image data written in each pixel of the liquid crystal display panel in the first and second illuminative lights from the plane light source in synchronization with the writing of the unit color image data.

The three-dimensional liquid crystal display device comprises: the liquid crystal display panel which selectively displays the color image of three colors of red, green and blue of the color images for right and left eyes in accordance with the color image data for the right and left eyes; the plane light source which irradiates the liquid crystal display panel with the first and second illuminative lights emitting the lights of three colors of red, green and blue, having such directivities that the peaks of the emitted light intensities exist in the first and second directions of observer's right and left eyes; and the control means for selecting the unit color image data of three colors of red, green and blue for displaying the color images for the right and left eyes in the predetermined order to write the data in the pixels of the liquid crystal display panel in the frame, and for emitting the illuminative light having the color and directivity corresponding to the written unit color image data of the first and second illuminative lights from the plane light source from the plane light source in synchronization with the writing of the unit color image data. The three-dimensional color image is displayed by field sequential display, and six unit color images in total including red, green and blue images for the right and left eyes can be displayed in the frame using all pixels of the liquid crystal display panel. Therefore, the three-dimensional color image having the high resolution can be displayed. Additionally, by the use of the plane light source which irradiates the liquid crystal display panel with the first and second illuminative lights emitting the lights of three colors of red, green and blue, having such directivity that the peaks of the emitted light intensities exist in the first and second directions of the observer's right and left eyes, the image incident upon the observer's right and left eyes is selected, and therefore the structure is simple, and can be easily manufactured.

In this three-dimensional liquid crystal display device, the plane light source preferably comprises: at least two light emitting elements which selectively emit lights of three colors of red, green and blue; a light guide plate which guides the respective lights produced by these light emitting elements to emit the light toward different directions inclined with respect to a normal line of a light guide plate surface; and a collimating film which emits one of the lights emitted toward the respective different directions from the light guide plate as the first illuminative light toward the first direction and which emits the other light as the second illuminative light toward the second direction. Furthermore, the collimating film includes a plurality of elongated ridges disposed in parallel with the first and second incidence end surfaces of the light guide plate on the surface facing the light guide plate, and each of the plurality of elongated ridges preferably includes: an incidence surface which faces the emission surface of the light guide plate to guide the light emitted in mutually different directions from the emission surface of the light guide plate; a first reflective surface which reflects one of the lights of the mutually different directions, guided from the incidence surface, in a first direction; and a second reflective surface which reflects the other light having the different direction, guided from the incidence surface, in a second direction.

Furthermore, the light guide plate comprises a plate-like transparent member including: first and second incidence end surfaces which are formed on end surfaces of the transparent member facing each other and upon which the light is incident; and an emission surface which emits the light incident upon the first and second incidence end surfaces and guided in the transparent member in mutually different directions. The light emitting element comprises first and second light emitting elements which are disposed on the first and second incidence end surfaces of the light guide plate to face each other and which produce the lights of three colors of red, green and blue to selectively emit the lights to the incidence end surfaces. The collimating film preferably comprises an optical film which is disposed on the emission surface of the light guide plate and which emits the light incident upon the light guide plate via the first incidence end surface and emitted from the emission surface as a first illuminative light having such directivity that the peak of the emitted light intensity exists in the first direction and which emits the light incident upon the light guide plate via the second incidence end surface and emitted from the emission surface as a second illuminative light having such directivity that the peak of the emitted light intensity exists in the second direction. The collimating film comprises an elongated ridge formed on a base film, and the elongated ridge comprises: first and second reflective surfaces comprising circular surfaces intersecting with the surface of the base film; and an incidence surface parallel to the emission surface of the light guide plate intersecting with the circular surface. Further in the collimating film, the elongated ridge comprising two circular surfaces and one plane may also be formed on the base film, while the adjacent elongated ridges are brought into close contact. Furthermore, in the collimating film, the incidence surface of the elongated ridge may also be disposed in close contact with the emission surface of the light guide plate. Furthermore, in the collimating film, the incidence surface of the elongated ridge is preferably bonded to the emission surface of the light guide plate via an adhesive layer, and further the elongated ridge of the collimating film is preferably formed of a transparent material whose refractive index is substantially equal to that of the light guide plate.

In this three-dimensional liquid crystal display device, the control means writes unit color image data of three colors of red, green and blue of the color image for the left eye and that of three colors of red, green and blue of the color image for the right eye in order into the respective pixels of the liquid crystal display panel. Alternatively, the means writes the unit color image data of red of the color image for the left eye, that of red of the color image for the right eye, that of green of the color image for the left eye, that of green of the color image for the right eye, that of blue of the color image for the left eye, and that of blue of the color image for the right eye in order into the respective pixels of the liquid crystal display panel. Alternatively, the means writes the unit color image data of red of the color image for the left eye, that of blue of the color image for the right eye, that of green of the color image for the left eye, that of green of the color image for the right eye, that of blue of the color image for the left eye, and that of red of the color image for the right eye in order into the respective pixels of the liquid crystal display panel. Alternatively, the means writes the unit color image data of red of the color image for the left eye, that of green of the color image for the left eye, that of blue of the color image for the right eye, that of green of the color image for the right eye, that of blue of the color image for the left eye, and that of red of the color image for the right eye in order into the respective pixels of the liquid crystal display panel. In synchronization with end of the writing, lighting of the light source is controlled in accordance with the color of the written unit color image data and the written image data for the right and left eyes.

The liquid crystal display panel may be a liquid crystal display element of TN mode, comprising: a pair of substrates on which electrodes are formed; a liquid crystal layer sealed between the electrodes and twisted/oriented by 90°; and a pair of polarizing plates disposed via the pair of substrates, or a liquid crystal display element of homogeneous orientation, comprising a homogeneously oriented liquid crystal layer without twisting/orienting the liquid crystal layer.

Further in the three-dimensional liquid crystal display device, at least one directive diffusion plate having diffusion characteristics with respect to the light incident from the predetermined direction may also be disposed between the liquid crystal display panel and the plane light source. The directive diffusion plate may further comprise: a first directive diffusion plate having diffusion characteristics with respect to the first illuminative light emitted in the first direction from the plane light source; and a second directive diffusion plate having the diffusion characteristics with respect to the second illuminative light emitted in the second direction from the plane light source.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
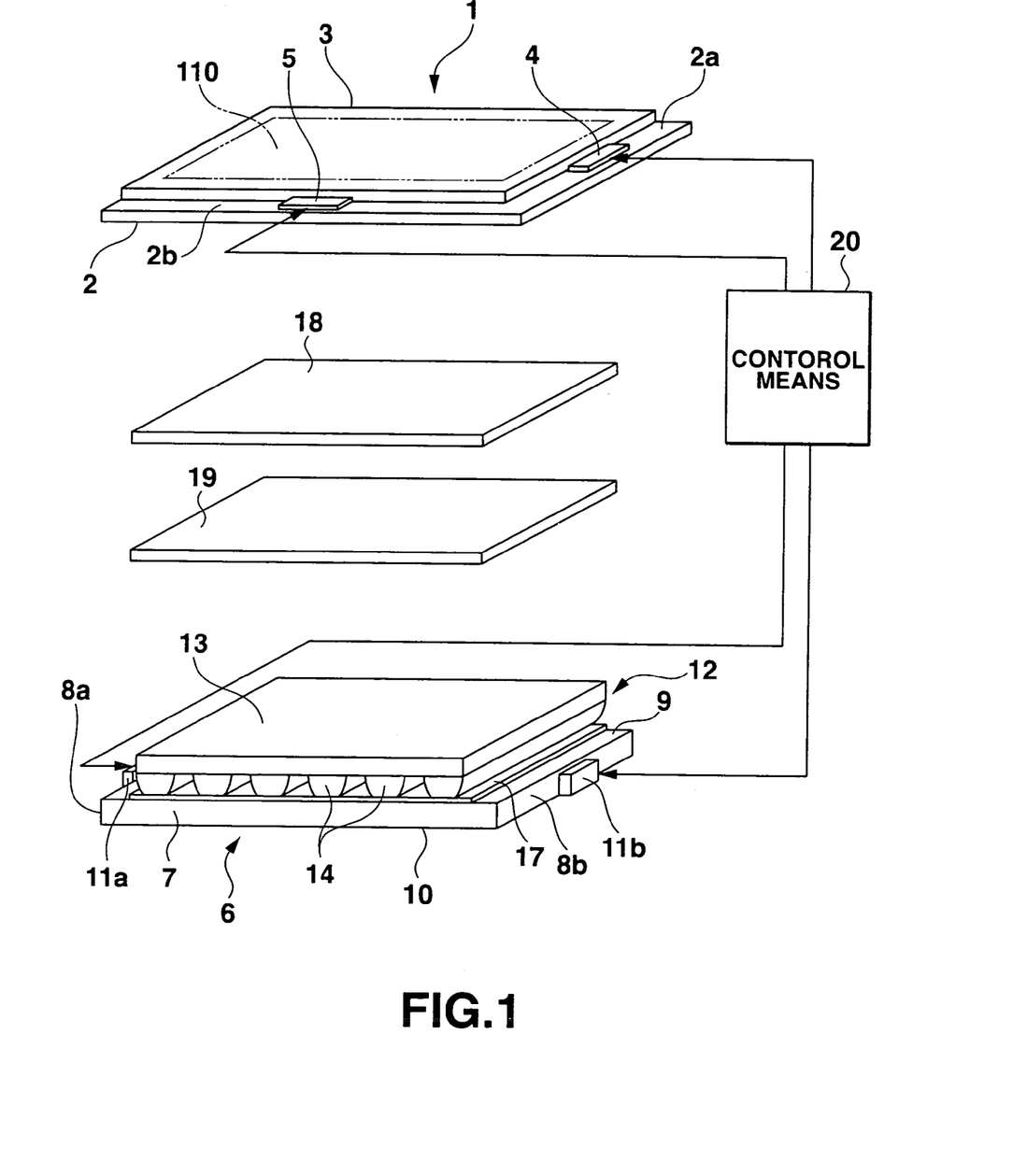
FIG. 1 is an exploded perspective view of a liquid crystal display device according to an embodiment of the present invention.
Figure 2:
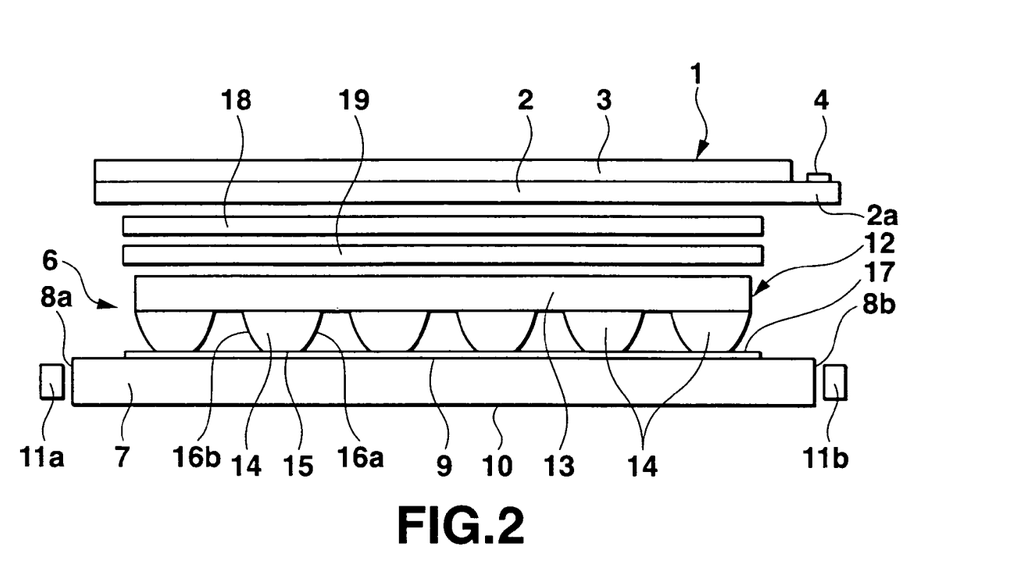
FIG. 2 is a side view of the liquid crystal display device.
Figure 3:
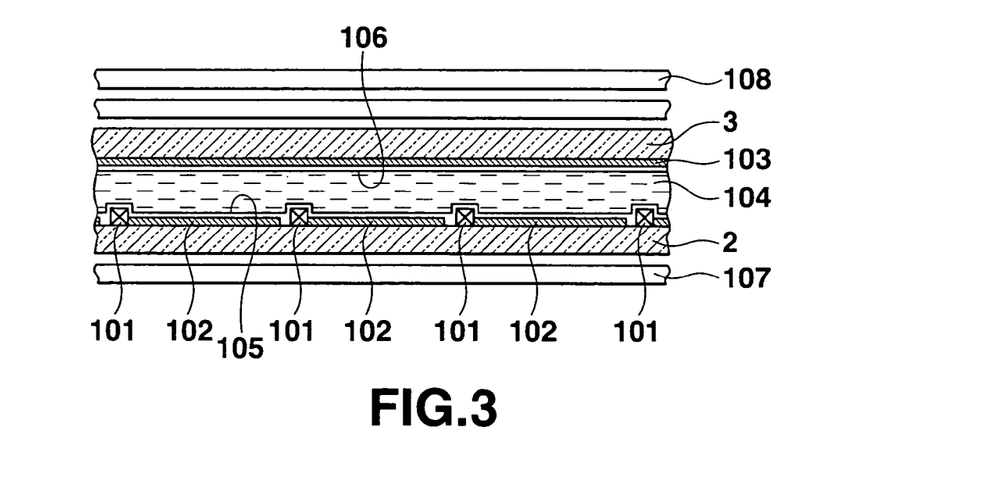
FIG. 3 is a sectional view of a liquid crystal display panel.

FIGS. 1 to 13 show an embodiment of the present invention, in which FIG. 1 is an exploded perspective view of a liquid crystal display device, FIG. 2 is a side view of the liquid crystal display device, and FIG. 3 is a sectional view of a liquid crystal display element for use in the liquid crystal display device.

As shown in FIGS. 1 to 3, the liquid crystal display device includes a liquid crystal display panel 1 including a plurality of pixels which are arranged in a matrix form and in which image data for right and left eyes are selectively written for observation separately with the right and left eyes, to selectively display images for the right and left eyes in accordance with the image data for the right and left eyes. A plane light source 6 is disposed on a side opposite to (hereinafter referred to as an incidence side) an observation side (upper side in the drawing) of the liquid crystal display panel 1. First and second directive diffusion plates 18, 19 are disposed between the liquid crystal display panel 1 and the plane light source 6. A control means 20 is provided for driving the liquid crystal display panel 1 and the plane light source 6.

As shown in FIG. 3, the liquid crystal display panel 1 is an active matrix liquid crystal display panel using, for example, thin film transistors (TFTs) as active elements. The panel includes a pair of transparent substrates 2, 3 bonded via a frame-shaped sealing material (not shown provided therebetween). On one substrate, for example, a surface of an incidence-side substrate 2, facing an observation-side substrate 3, a plurality of transparent pixel electrodes 102 arranged in a matrix form in line and row directions; a plurality of TFTs 101 connected to the pixel electrodes 102; a plurality of gate wirings (not shown) which supply gate signals to the TFTs 101 of lines; and a plurality of data wirings (not shown) which supply data signals to the TFTs 101 of rows are disposed. On the surface of the other substrate 3 on the observation side, which faces the substrate 2 on the incidence side, a transparent facing electrode 103 formed of a film is disposed to form a plurality of pixels arranged in the matrix form by regions facing the plurality of pixel electrodes 102. A liquid crystal layer 104 is disposed in a region surrounded with the sealing material between the substrates 2, 3.

The incidence-side substrate 2 includes driver mounted portions 2a, 2b (FIG. 1) laterally protruding to the outside of the observation-side substrate 3 on edges of the line and row directions. The gate wirings are connected to a gate-side driver 4 mounted on the driver mounted portion 2a extended in the line direction, and the data wirings are connected to a data-side driver 5 mounted on the driver mounted portion 2b extended in the row direction. The facing electrode 103 is connected to reference potentials of one or both of the gate-side driver 4 and the data-side driver 5 via cross connection portion disposed on a substrates-bonded portion by the sealing material and a facing electrode connection wiring formed on one or both of the driver mounted portions 2a, 2b.

The liquid crystal display panel 1 may be, for example, a panel of twisted nematic (TN) type in which orientation treatment directions of orientation films 105, 106 formed on the facing surfaces of the pair of substrates 2, 3 are set to 90° and in which liquid crystal molecules of the liquid crystal layer 104 are twisted/oriented substantially at a twist angle of 90° between the pair of substrates 2, 3. Alternatively, the panel may be a liquid crystal display element of homogeneous orientation type, in which the orientation treatment directions of the orientation films 105, 106 formed on the facing surfaces of the pair of substrates 2, 3 are set to be parallel to each other and in which liquid crystal molecules of the liquid crystal layer 104 are oriented in parallel and homogeneously without being substantially twisted/oriented between the pair of substrates 2, 3. An incidence-side polarizing plate 107 and a display-side polarizing plate 108 are disposed on the outer surfaces of the pair of substrates 2, 3 in such a manner that transmitting axes substantially cross each other at right angles or are disposed substantially parallel to each other. Furthermore, to improve characteristics of an angle of vision or contrast of the liquid crystal display element, if necessary, a phase plate 109 is disposed between the display-side polarizing plate 108 and the substrate 3.

The plane light source 6 emits a first illuminative light (hereinafter referred to as the illuminative light for the left eye) of three colors of red, green and blue having such directivity that a peak of an emitted light intensity exists in a direction of one of the display observer's right and left eyes with respect to a normal line of the liquid crystal display panel 1, for example, in a first direction inclined at a predetermined angle in a direction of the left eye (hereinafter referred to as the left-eye direction). The source also emits a second illuminative light (hereinafter referred to as the illuminative light for the right eye) of three colors of red, green and blue having such directivity that the peak of the emitted light intensity exists in a direction of the other eye of the display observer with respect to the normal line, that is, in a second direction inclined at a predetermined angle in a direction of the right eye (hereinafter referred to as the right-eye direction) toward the liquid crystal display panel 1.

The plane light source 6 comprises a light guide plate 7 formed of a plate-like transparent member, first and second light emitting elements 11a, 11b which emit light toward the light guide plate 7, and a collimating film 12 superposed on the light guide plate. The light guide plate 7 comprises first and second incidence end surfaces 8a, 8b which are formed on opposed end surfaces of the transparent plate 7 and upon which the light is incident and an emission surface 9 to emit the light which is incident upon the first and second incidence end surfaces 8a, 8b and which is guided in the transparent member 7 in mutually different directions, and a reflective surface 10 which reflects the light incident upon the transparent member via the incidence end surfaces 8a, 8b, toward the emission surface 9. The first and second light emitting elements 11a, 11b are disposed facing the first and second incidence end surfaces 8a, 8b of the light guide plate 7, and selectively emit the lights of three colors of red, green and blue toward the incidence end surfaces 8a, 8b. The collimating film 12 is disposed on the side of the emission surface 9 of the light guide plate 7, and emits the light incident upon the light guide plate 7 via the first incidence end surface 8a and emitted from the emission surface 9 as the illuminative light for the left eye, having such a directivity that the peak of the emitted light intensity exists in the left-eye direction. The film 12 also emits the light incident upon the light guide plate 7 via the second incidence end surface 8b and emitted from the emission surface 9 as the illuminative light for the right eye having such a directivity that the peak of the emitted light intensity exists in the right-eye direction.

The light guide plate 7 is formed of an acrylic resin having a refractive index of 1.49. The emission surface 9 of the plate has an area larger than a display area 110 (FIG. 1) in which a plurality of pixels of the liquid crystal display panel 1 are arranged in the matrix form. The emission surface 9 of one plate surface of the light guide plate 7 and the reflective surface 10 of the other plate surface are formed in flat surfaces extending parallel to each other. The first and second incidence end surfaces 8a, 8b are formed on surfaces vertical to the emission and reflective surfaces 9, 10.

An inner structure of each of the first and second light emitting elements 11a, 11b is not shown. Each of the elements may comprise a red light emitting diode (LED) emitting a red light, a green LED emitting a green light, and a blue LED emitting a blue light. These LEDs are selectively driven, and selectively emit the lights of three colors of red, green and blue toward the incidence end surfaces 8a, 8b of the light guide plate 7.

Instead, the first and second light emitting elements may also be three cold cathode tubes which emit the lights of the red, green and blue colors.

In the following, the first light emitting element 11a disposed facing the first incidence end surface 8a on the right side (left side in FIGS. 1 and 2) viewed from the observation side of the liquid crystal display panel 1 in the first and second incidence end surfaces 8a, 8b of the light guide plate is referred to as a light emitting element for the left eye. The second light emitting element 11b disposed facing the second incidence end surface 8b on the left side (right side in FIGS. 1 and 2) viewed from the observation side is referred to as a light emitting element for the right eye.

The collimating film 12 comprises a transparent base film 13 having an area corresponding to the whole region of the display area 110 of the liquid crystal display panel 1, and a plurality of transparent elongated ridges 14 disposed parallel to the first and second incidence end surfaces 8a, 8b of the light guide plate 7 and at a predetermined pitch in the whole area of the surface of the base film 13 facing the light guide plate 7.

Figure 4:
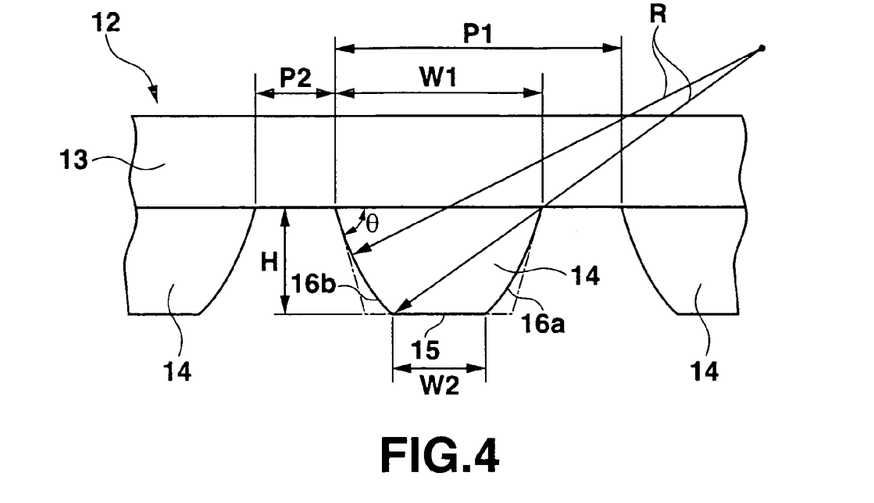
FIG. 4 is an enlarged side view of a part of a collimating film of a plane light source in the liquid crystal display device.

FIG. 4 is an enlarged side view of a part of the collimating film 12. Each of the elongated ridges 14 of the collimating film 12 includes an incidence surface 15 which faces the emission surface 9 of the light guide plate 7 and upon which the light emitted in the mutually different direction from the emission surface 9 of the light guide plate 7 is incident. The film 12 further includes first and second reflective surfaces 16a, 16b. One surface 16a is positioned between one side edge of the incidence surface 15, for example, a left edge viewed from the observation side of the liquid crystal display panel 1 (right side edge in FIG. 4) and the base film 13, and reflects one of the lights of the mutually different directions, introduced from the incidence surface 15, that is, the light of a left direction viewed from the observation side in the left-eye direction. The other surface 16b is positioned between the other side edge of the incidence surface 15 (the right edge viewed from the observation side) and the base film 13, and reflects the other light in the mutually different directions, introduced from the incidence surface 15, that is, the light of a right direction viewed from the observation side in the right-eye direction.

Each elongated ridge 14 has a sectional shape in which a trapezoidal shape having an equal inclination angle of right/left oblique line shown by a virtual line (two-dot chain line) in FIG. 4 is a base. The incidence surface 15 is formed by a top face, and right and left inclined surfaces form said first and second reflective surfaces 16a, 16b.

The incidence surface 15 of the elongated ridge 14 is formed in a width slightly smaller than a top side length of the trapezoidal shape. A base portion of the first and second reflective surfaces 16a, 16b (portion on a base film 13 side) is formed on a linear regular reflective surface which matches the oblique side of the trapezoidal shape, and a portion on an incidence surface 15 side is formed in a condenser reflective surface curved in an outwardly protruding circular shape.

The collimating film 12 is prepared by molding a resin, using, for example, a metal mold, to form the plurality of elongated ridges 14 on one surface (surface facing the light guide plate 7) of the base film 13. The base film 13 is formed of polyethylene terephthalate (PET) having a refractive index of 1.55. The elongated ridge 14 is formed of an acrylic resin having a refractive index (1.49) which is equal to that of the light guide plate 7.

In the collimating film 12, as shown in FIG. 2, the incidence surfaces 15 of the elongated ridges 14 are bonded to the emission surface 9 of the light guide plate 7 via an acrylic adhesive 17. The material 17 has a refractive index substantially equal to that of the light guide plate 7 or the elongated ridge 14 of the collimating film 12. Thus, the incidence surfaces 15 of the elongated ridges 14 are closely attached to the emission surface 9 of the light guide plate 7.

The plane light source 6 is disposed in such a manner that the surface of the collimating film 12 on the base film 13 side face the liquid crystal display panel 1 on the incidence side (side opposite to the observation side) of the liquid crystal display panel 1.

Figure 5:
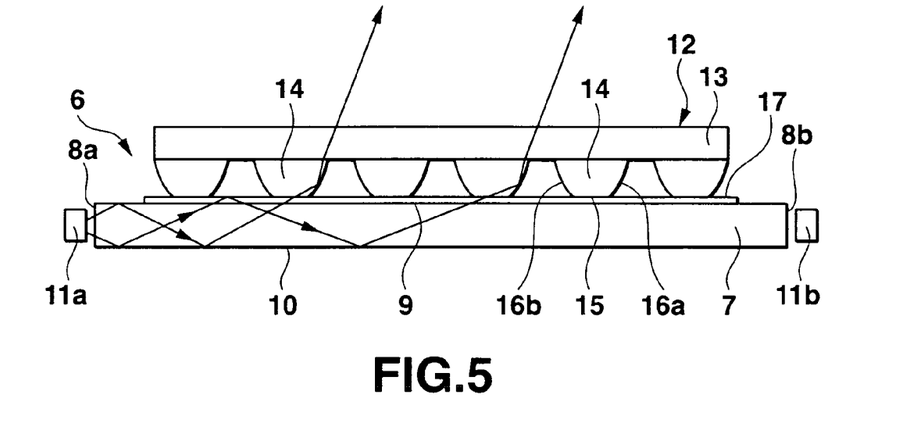
FIG. 5 is a diagram showing an emission state of an illuminative light for the left eye from the plane light source.

FIG. 5 shows an emission state of the illuminative light for the left eye from the plane light source 6. At this time, the light emitting element 11b for the right eye 11b is in an off-state, and only the light emitting element 11a for the left eye is turned on.

The light (light of any color of red, green and blue) emitted from the light emitting element 11a for the left eye is incident upon the light guide plate 7 via the first incidence end surface 8a. As shown by arrow lines in FIG. 5, the light is totally reflected by an interface between the reflective surface 10 of the light guide plate 7 and outside air (air layer having a refractive index of 1), and an interface between a region of the elongated ridge 14 other than a closely attached portion and the outside air (interface between the surface of the adhesive 17 and the outside air in a region coated with the adhesive 17) in the emission surface 9 of the light guide plate 7. The light is thus laterally guided into the substantially whole region in the light guide plate 7. In this guiding process, in the emission surface 9 of the light guide plate 7, the light guided to the closely attached surface to the elongated ridges 14 passes through the adhesive 17, and is guided into the elongated ridges 14 of the collimating film 12 via their incidence surfaces 15.

Since this light is incident upon the light guide plate 7 via the first incidence end surface 8a on the right side viewed from the observation side of the liquid crystal display panel 1, as shown in FIG. 5, the light is introduced into the elongated ridges 14 of the collimating film 12 via the incidence surfaces 15 toward a direction opposite to the first incidence end surface 8a with respect to the normal line of the emission surface 9 of the light guide plate 7, that is, toward the direction inclined on the left side viewed from the observation side. Then, the light is totally reflected by the interfaces between the first reflective surfaces 16a of the elongated ridges 14 on the left side viewed from the observation side and the outside air. The light passes through the base film 13 of the collimating film 12 as the illuminative light for the left eye having such a directivity that the peak of the emitted light intensity exists in the left-eye direction (the direction inclined at the predetermined angle in the direction of the display observer's left eye with respect to the normal line of the liquid crystal display panel 1), and is emitted toward the liquid crystal display panel 1.

Figure 6:
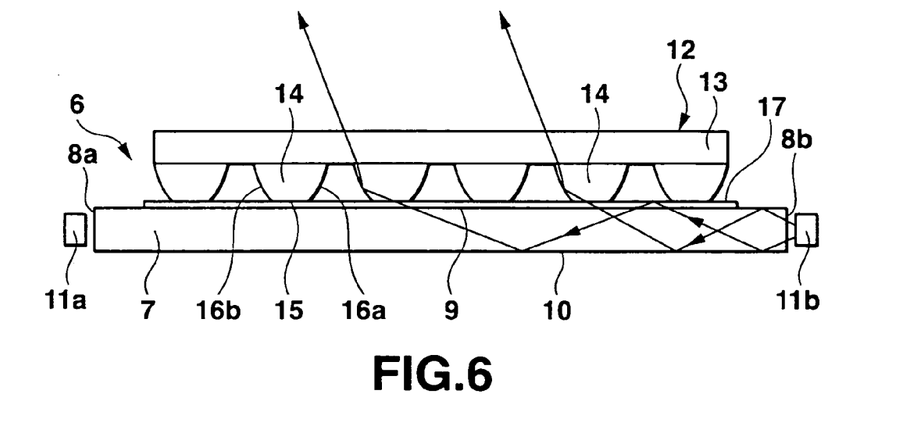
FIG. 6 is a diagram showing an emission state of an illuminative light for the right eye from the plane light source.

FIG. 6 shows an emission state of the illuminative light for the right eye from the plane light source 6. At this time, the light emitting element 11a for the left eye is in the off-state, and only the light emitting element 11b for the right eye is turned on.

The light (light of any color of red, green and blue) emitted from the light emitting element 11b for the right eye is incident upon the light guide plate 7 via the second incidence end surface 8b. As shown by arrow lines in FIG. 6, the light is totally reflected by an interface between the reflective surface 10 of the light guide plate 7 and the outside air, and an interface between the region of the elongated ridges 14 except the closely attached portion and the outside air (interface between the surface of the adhesive 17 and the outside air in the region coated with the adhesive 17) in the emission surface 9 of the light guide plate 7. The light is accordingly guided into the whole region in the light guide plate 7. In this process, in the emission surface 9 of the light guide plate 7, the light guided to the closely attached portions of the elongated ridges 14 passes through the adhesive 17, and is guided into the elongated ridges 14 of the collimating film 12 via the incidence surfaces 15.

Since this light is incident upon the light guide plate 7 via the second incidence end surface 8b on the left side viewed from the observation side of the liquid crystal display panel 1, as shown in FIG. 6, the light is introduced into the elongated ridges 14 of the collimating film 12 via the incidence surfaces 15 toward a direction opposite to the second incidence end surface 8b with respect to the normal line of the emission surface 9 of the light guide plate 7, that is, toward the direction inclined on the right side viewed from the observation side. Then, the light is totally reflected by the interfaces between the second reflective surfaces 16b of the elongated ridges 14 on the right side viewed from the observation side and the outside air. The reflected light passes through the base film 13 of the collimating film 12 as the illuminative light for the right eye having such a directivity that the peak of the emitted light intensity exists in the right-eye direction (the direction inclined at the predetermined angle in the direction of the display observer's right eye with respect to the normal line of the liquid crystal display panel 1), and is emitted toward the liquid crystal display panel 1.

In this manner, the plane light source 6 emits the light emitted from the light emitting element 11a for the left eye disposed facing the first incidence end surface 8a on the right side viewed from the observation side of the liquid crystal display panel 1 in the first and second incidence end surfaces 8a, 8b of the light guide plate 7 as the illuminative light for the left eye having such a directivity that the peak of the emitted light intensity exists in the left-eye direction toward the liquid crystal display panel 1 by the light guide plate 7 and the collimating film 12. The source 6 also emits the light from the light emitting element 11b for the right eye disposed facing the second incidence end surface 8b on the left side viewed from the observation side as the illuminative light for the right eye having such a directivity that the peak of the emitted light intensity exists in the right-eye direction toward the liquid crystal display panel 1 by the light guide plate 7 and the collimating film 12.

In the embodiment, as described above, the portions of the first and second reflective surfaces 16a, 16b of the elongated ridges 14 of the collimating film 12 on the incidence surface 15 side are formed to the condenser reflective surfaces curved in the outward protruding circular shape. Most of the light introduced from the incidence surfaces 15 is totally reflected by the interfaces between the condenser reflective surfaces and the outside air. Therefore, the illuminative lights for the right and left eyes having such directivities that peaks having higher intensities exist can be emitted toward the liquid crystal display panel 1.

The plane light source 6 is described, for example, in a range of about 12° to 16° in accordance with an observation distance of display by application of the liquid crystal display device in such a manner that directions including the peaks of the intensities of the illuminative lights for the right and left eyes match those toward the display observer's right and left eyes.

In the preferred embodiment, the plane light source 6 is designed in such a manner that each of the directions in which the peaks of the intensities of the illuminative lights for the right and left eyes exist is inclined approximately by 15° with respect to the normal line of the plane light source 6.

An emission angle of the light emitted from the emission surface 9 of the light guide plate 7 differs with the thickness of the light guide plate 7. When the light guide plate 7 is thicker, the emission angle with respect to the emission surface 9 increases, and the emitted light intensity increases, but luminance unevenness of the emitted light increases.

An introduced amount of the light emitted from the emission surface 9 of the light guide plate 7 into the collimating film 12 differs with a base portion width (width of the surface contacting the base film 13) W1 and an incidence surface width W2 in the elongated ridges 14. When the incidence surface width W2 is increased, the introduced amount of light increases, and the emitted light intensity also rises. When the incidence surface width W2 is increased in this manner, Moire fringes are generated by interference of lights introduced into the elongated ridges 14 via the incidence surfaces 15 and emitted from the other surface of the base film 13. On the other hand, when the base portion width W1 of the elongated ridge 14 is increased, the emitted light intensity drops, and further Moire fringes are also generated.

Therefore, in the embodiment, the thickness of the light guide plate 7 formed of the acrylic resin having a refractive index of 1.49 is set to 0.80 to 2.00 mm. In the collimating film 12, a pitch P1 of the elongated ridges 14 formed of the acrylic resin having a refractive index of 1.49, a distance P2 between the adjacent elongated ridges 14, the base portion width W1 of the elongated ridge 14, the incidence surface width W2 of the elongated ridge 14, a height H of the elongated ridge 14, an inclination angle $\theta$ of the base portion (regular reflective surface) of the reflective surfaces 16a, 16b of the elongated ridge 14 with respect to the base film 13 surface, and a radius of curvature R of the condenser reflective surface of the reflective surfaces 16a, 16b are set in the following ranges:

P1=0.05 to 0.50 mm;
P2=0.03 to 0.15 mm;
W1=0.02 to 0.35 mm;
W2=0.005 to 0.05 mm;
H=0.01 to 0.10 mm;
$\theta$=50° to 70°; and
R=0.30 to 0.80 mm.

Accordingly, the illuminative lights for the right and left eyes having intensity distributions in which the peak of the emitted light intensity exists in the direction around 15° with respect to the normal line are emitted from the plane light source 6 with a sufficient intensity and without generating any Moire fringes.

In the embodiment, the incidence surfaces 15 of the elongated ridges 14 of the collimating film 12 are bonded to the emission surface 9 of the light guide plate 7 via the adhesive 17, but the refractive index of the adhesive 17 is substantially equal to that of the light guide plate 7 or the elongated ridge 14 of the collimating film 12. Moreover, the film thickness is about 25 μm. Therefore, the adhesive 17 hardly influences the emission angles of the illuminative lights for the right and left eyes.

The values of P1, P2, W1, W2, H, $\theta$, R of the collimating film 12 are preferably as follows:

P1=0.15 to 0.20 mm;
P2=0.08 to 0.10 mm;
W1=0.07 to 0.10 mm;
W2=0.015 to 0.030 mm;
H=0.03 to 0.06 mm;
$\theta$=55° to 65°; and
R=0.40 to 0.60 mm.

In the ranges, the illuminative lights for the right and left eyes having the intensity distributions in which the peak of the emitted light intensity exists in the direction around 15° with respect to the normal line are emitted from the plane light source 6 with a higher intensity and without generating any Moire fringes.

Figure 7:
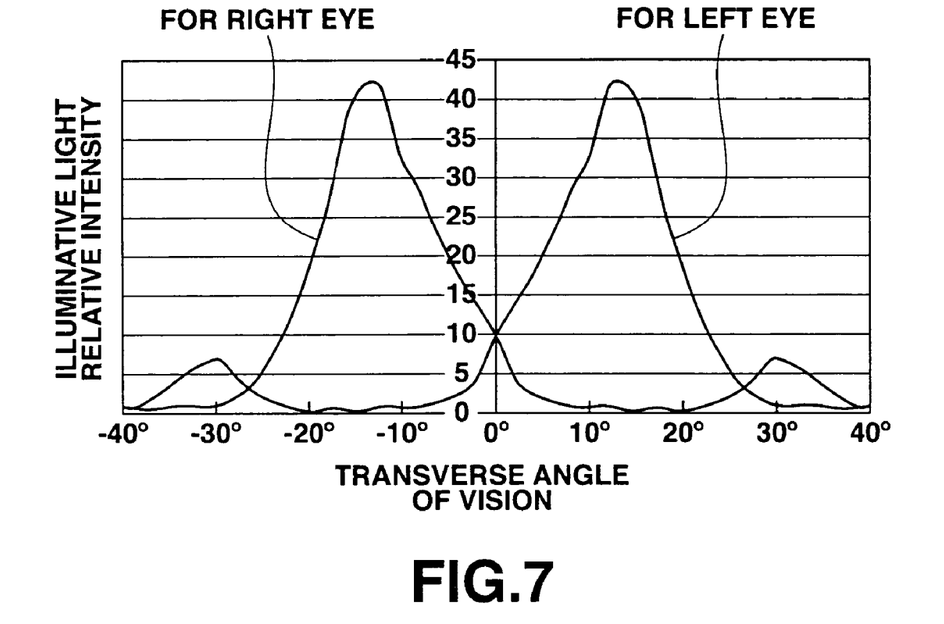
FIG. 7 is an intensity distribution diagram of the illuminative lights for the right and left eyes, emitted from the plane light source.

FIG. 7 is an intensity distribution diagram of the illuminative lights for the right and left eyes, emitted from the plane light source 6, in which the plate thickness of the light guide plate 7 is in a range of 0.80 to 2.00 mm, and the values of P1, P2, W1, W2, H, $\theta$, R of the collimating film 12 are set to the preferable ranges as described above.

In FIG. 7, a transverse angle of vision is an angle of an abscissa direction (direction crossing a length direction of the elongated ridge 14 of the collimating film 12 at right angles) of the plane light source 6 viewed from the observation side of the liquid crystal display panel 1, a negative angle of vision is an angle in a left direction with respect to the normal line of the plane light source 6, and a positive angle of vision is an angle of a right direction with respect to the normal line.

As seen from FIG. 7, the plane light source 6 emits the illuminative light for the left eye having an intensity distribution in which the peak of the emitted light intensity exists in the vicinity of the direction inclined approximately by 15° in the left direction with respect to the normal line (direction having an angle of vision of 0°). The source also emits the illuminative light for the right eye having the intensity distribution in which the peak of the emitted light intensity exists in the vicinity of the direction inclined approximately by 15° in the right direction with respect to the normal line.

The emitted light intensity into a front surface direction (direction in the vicinity of the normal line) of the plane light source 6 is about 40% or less of that in the direction in which the peak of the illuminative light for the right and left eyes exists as shown in FIG. 7. Therefore, it is possible to emit the illuminative lights for the right and left eyes which are clearly divided and which have good directivity.

In the first and second directive diffusion plates 18, 19 disposed between the liquid crystal display panel 1 and the plane light source 6, the first directive diffusion plate 18 is a diffusion plate having diffusion characteristics with respect to the illuminative light for the left eye emitted in the left-eye direction from the plane light source 6. The second directive diffusion plate 19 has diffusion characteristics with respect to the illuminative light for the right eye emitted in the right-eye direction from the plane light source 6. Either diffusion plate has an area corresponding to the whole region of the display area 110 of the liquid crystal display panel 1. The first directive diffusion plate 18 will be hereinafter referred to as a directive diffusion plate for the left eye, and the second directive diffusion plate 19 will be referred to as a directive diffusion plate for the right eye.

Figure 8:
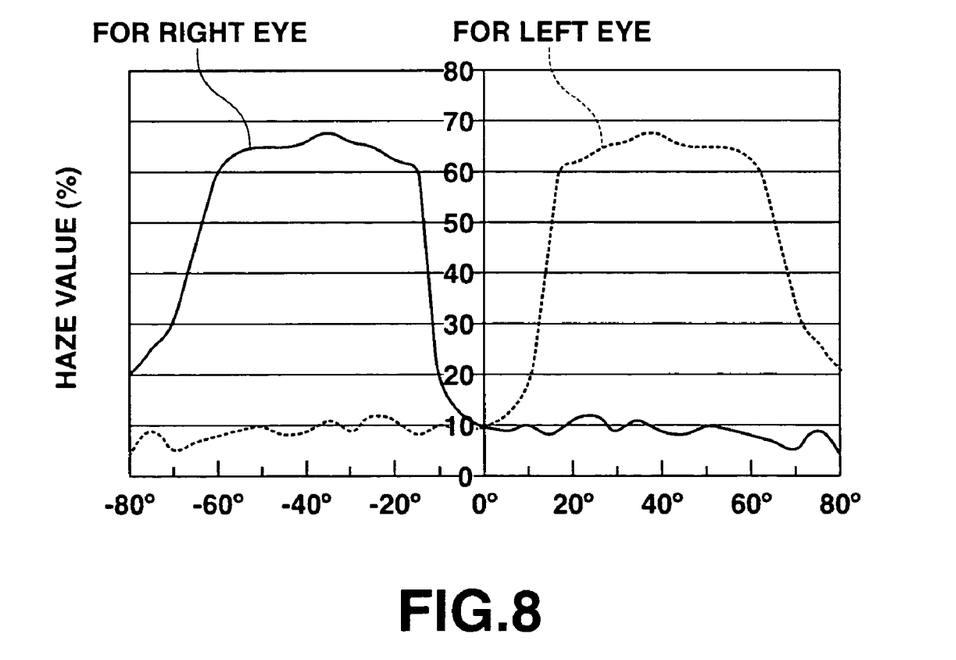
FIG. 8 is a diffusion characteristic diagram of directive diffusion plates for the right and left eyes in the liquid crystal display device.
Figure 9:
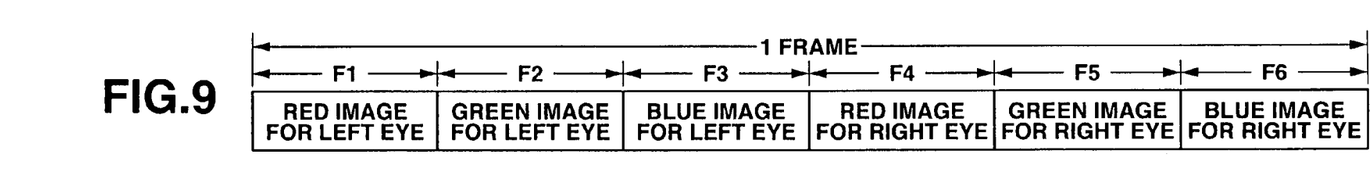
FIG. 9 is a diagram showing an example of a display order of monochromatic images for the right and left eyes in the liquid crystal display device.
Figure 10:
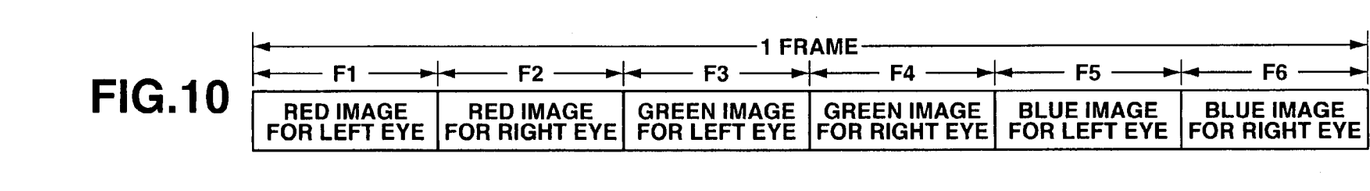
FIG. 10 is a diagram showing another example of the display order of the monochromatic images for the right and left eyes.
Figure 11:
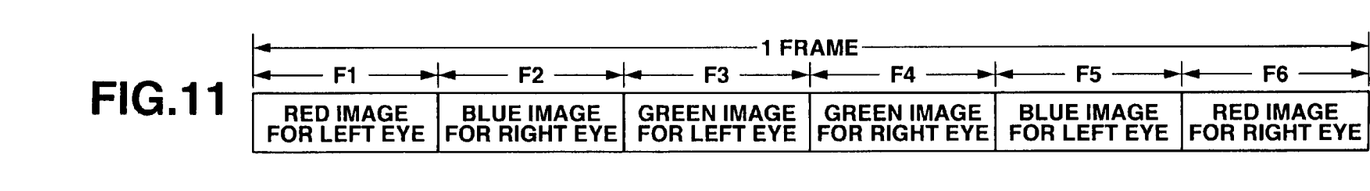
FIG. 11 is a diagram showing another example of the display order of the monochromatic images for the right and left eyes.
Figure 12:
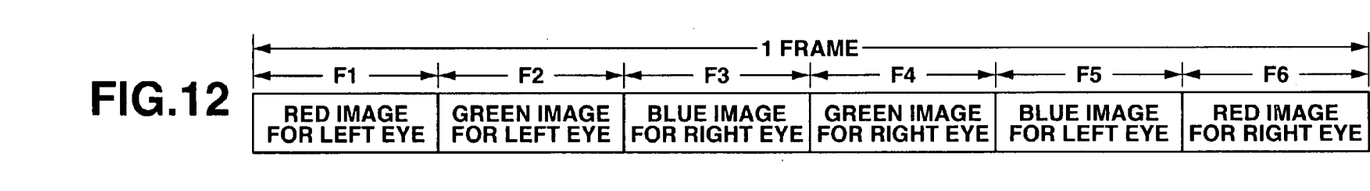
FIG. 12 is a diagram showing another example of the display order of the monochromatic images for the right and left eyes.
Figure 13:
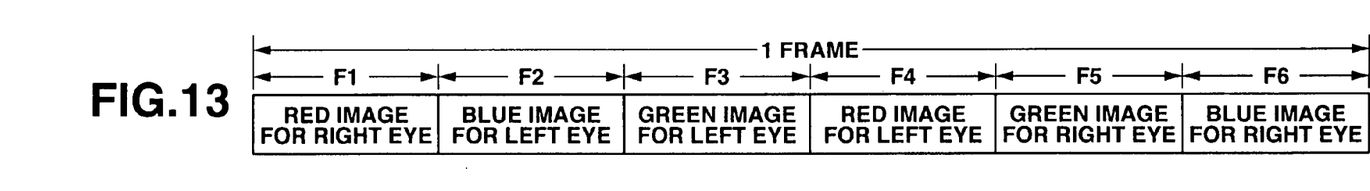
FIG. 13 is a diagram showing another example of the display order of the monochromatic images for the right and left eyes.

FIG. 8 is an diffusion characteristic diagram of the first directive diffusion plate 18 and second directive diffusion plate 19. In FIG. 8, the transverse angle of vision is an angle of a direction parallel to the abscissa (lateral direction) of the plane light source 6 viewed from the observation side of the liquid crystal display panel 1, the negative angle of vision is an angle in the left direction with respect to the normal lines of the diffusion plates 18, 19, and the positive angle of vision is an angle of the right direction with respect to the normal line.

As seen from FIG. 8, the directive diffusion plate for the left eye 18 hardly diffuses the illuminative light for the right eye and passes the light in the illuminative lights for the right and left eyes emitted from the plane light source 6, and diffuses and emits the illuminative light for the left eye on the liquid crystal display panel 1 side. The directive diffusion plate for the right eye 19 hardly diffuses the illuminative light for the left eye and passes the light in the illuminative lights for the right and left eyes emitted from the plane light source 6, and diffuses and emits the illuminative light for the right eye on the liquid crystal display panel 1 side.

Diffusion start angles of the directive diffusion plate for the left eye 18 and directive diffusion plate for the right eye 19 are set in accordance with angles of directions in which the peaks of the intensities of the illuminative lights for the right and left eyes emitted from the plane light source 6 exist.

In the embodiment, as described above, the plane light source 6 is designed in such a manner that each of the directions in which the peaks of the intensities of the illuminative lights for the right and left eyes exist is inclined approximately by 15° with respect to the normal line of the plane light source 6. Therefore, each of the diffusion start angles of the directive diffusion plates for the both eyes 18, 19 (angles with respect to the normal lines of the diffusion plates 18, 19) is set around 15° as shown in FIG. 8.

Both directive diffusion plates 18, 19 are stacked upon each other. The directive diffusion plate for the right eye 19 is disposed in the vicinity of or in contact with the emission surface of the plane light source 6 (base film 13 surface of the collimating film 12), and the incidence surface of the liquid crystal display panel 1 is disposed in the vicinity of or in contact with the directive diffusion plate for the left eye 18.

Therefore, according to the liquid crystal display device, the illuminative light for the left eye emitted from the plane light source 6 including the emitted light of the direction in which the peak of the emitted light intensity exists is diffused by the directive diffusion plate for the left eye 18. The illuminative light for the right eye emitted from the plane light source 6 including the emitted light of the direction in which the peak of the emitted light intensity exists is diffused by the directive diffusion plate for the right eye 19. Each of the illuminative lights can be incident upon the liquid crystal display panel 1 as a light having a uniform intensity distribution without any Moire fringes.

Additionally, the directive diffusion plate for the left eye 18 has the diffusion characteristics with respect to the illuminative light for the left eye in the illuminative lights for the right and left eyes emitted from the plane light source 6, and hardly diffuses the illuminative light for the right eye to pass the light. The directive diffusion plate for the right eye 19 has the diffusion characteristics with respect to the illuminative light for the right eye, and hardly diffuses the illuminative light for the left eye to pass the light. Therefore, the diffused illuminative lights for the right and left eyes can be incident upon the liquid crystal display panel 1 substantially without changing the directions.

In the embodiment, the directive diffusion plate for the left eye 18 is disposed on the liquid crystal display panel 1 side, and the directive diffusion plate for the right eye 19 is disposed on the plane light source 6 side. Conversely, the first directive diffusion plate 18 may also be disposed on the plane light source 6 side, and the second directive diffusion plate 19 may also be disposed on the liquid crystal display panel 1 side.

Next, the control means 20 for driving the liquid crystal display panel 1 and the plane light source 6 will be described. Although any concrete constitution is not shown, the control means 20 comprises: a write control circuit which controls the gate-side driver 4 and data-side driver 5 of the liquid crystal display panel 1; and an illumination control circuit which controls emission of the lights of three colors of red, green and blue from the both light emitting elements 11a, 11b of the plane light source 6.

The control means 20 selects unit color image data of three colors of red, green and blue for displaying the image for the left eye, and unit color image data of three colors of red, green and blue for displaying the image for the right eye in an optional order to write the data in pixels of the liquid crystal display panel in a frame for displaying a three-dimensional image comprising the images for the right and left eyes. The means emits an illuminative light having color and directivity corresponding to the unit color image data written in each pixel of the liquid crystal display panel 1 from the plane light source 6 in the illuminative lights for the right and left eyes in synchronization with the writing of the unit color image data.

The unit color image data of three colors of red, green and blue for displaying the images for the right and left eyes are image data of color components of red, green and blue by right and left lenses in the color images picked up by a digital camera including two right/left image pickup lenses disposed, for example, at an interval of 6 cm.

The liquid crystal display device displays a three-dimensional color image by field sequential display. In one frame for displaying one three-dimensional image, the control means 20 selects the unit color image data of three colors of red, green and blue for displaying the image for the left eye and that of three colors of red, green and blue for displaying the image for the right eye in the optional and successively writes the data in the respective pixels of the liquid crystal display panel 1. The illuminative light having the color and directivity corresponding to the unit color image data written in each pixel of the liquid crystal display panel 1 the control means 20 is emitted from the plane light source 6 in synchronization with the write of the unit color image data. Accordingly, six unit color images in total including red, green and blue images for the left eye and those for the right eye are successively displayed in the predetermined order during one frame, so that the display observer observes the three-dimensional color image.

That is, in the liquid crystal display device, one frame for displaying one three-dimensional image is formed by six fields, and one of six unit color images including the red, green and blue images for the left eye and those for the right eye is successively displayed in the optional order for each field.

FIGS. 9 to 13 show a plurality of typical examples of the display order of the red, green and blue images for the left eye and those for the right eye in one frame.

In the embodiment, one frame is set to 30 Hz, one field is set to 180 Hz, and a satisfactory three-dimensional color image is observed without any flickering.

According to the liquid crystal display device, since the six unit color images are successively displayed one by one, each of the unit color images is displayed using all the pixels of the liquid crystal display panel. Thus, the three-dimensional color image having high resolution can be displayed.

Additionally, according to the liquid crystal display device, the plane light source 6 may emit the illuminative light for the left eye of three colors of red, green and blue, having such a directivity that the peak of the emitted light intensity exists in the direction inclined at the predetermined angle in the observer's left-eye direction with respect to the normal line of the liquid crystal display panel 1. The source may also emit the illuminative light for the right eye of three colors of red, green and blue, having such a directivity that the peak of the emitted light intensity exists in the direction inclined at the predetermined angle in the observer's right-eye direction with respect to the normal line toward the all of the display area 110 in which a plurality of pixels of the liquid crystal display panel 1 are arranged. Therefore, the liquid crystal display device can be easily manufactured.

Moreover, in the embodiment, the plane light source 6 comprises: the light guide plate 7 formed of the plate-like transparent member and including the first and second incidence end surfaces 8a, 8b which are formed on the end surfaces of the transparent member facing each other and upon which the light is incident, and the emission surface 9 to emit the light which is incident upon the first and second incidence end surfaces 8a, 8b and which is guided in the transparent member in the mutually different directions. The source 6 also comprises the light emitting elements 11a, 11b for the right and left eyes which are disposed facing the first and second incidence end surfaces 8a, 8b of the light guide plate 7 to selectively emit the lights of three colors of red, green and blue toward the incidence end surfaces 8a, 8b. The source further comprises the collimating film 12 which is disposed on the emission surface 9 of the light guide plate 7. The surface 9 emits the light incident upon the light guide plate 7 via the first incidence end surface 8a and emitted from the emission surface 9 as the illuminative light for the left eye, having such a directivity that the peak of the emitted light intensity exists in the left-eye direction and also emits the light incident upon the light guide plate 7 via the second incidence end surface 8b and emitted from the emission surface 9 as the illuminative light for the right eye having such a directivity that the peak of the emitted light intensity exists in the right-eye direction. Therefore, the illuminative lights for the right and left eyes can be emitted from the plane light source 6.

Additionally, in the embodiment, the collimating film 12 includes a plurality of elongated ridges 14 disposed in parallel with the first and second incidence end surfaces 8a, 8b of the light guide plate 7 on the surface facing the light guide plate 7. Each of the elongated ridges 14 includes: the incidence surface 15 which faces the emission surface 9 of the light guide plate 7 and which introduces the light emitted in the mutually different directions from the emission surface 9 of the light guide plate 7; the first reflective surface 16a which reflects one of the lights of the mutually different directions, introduced from the incidence surface 15, in the left-eye direction; and the second reflective surface 16b which reflects the other light in the mutually different directions, introduced from the incidence surface 15, in the right-eye direction. Therefore, the illuminative lights for the right and left eyes having satisfactory directivity are incident upon the liquid crystal display panel 1, so that the satisfactory three-dimensional color image can be observed.

Furthermore, in the embodiment, since the first and second reflective surfaces 16a, 16b of the elongated ridge 14 are formed on the condenser reflective surface curved in the outward protruding circular shape, the light introduced from the incidence surface 15 can be reflected by the condenser reflective surface, and the illuminative light for the right and left eyes having such a directivity that a higher-intensity peak exists can be emitted toward the liquid crystal display panel 1.

Moreover, in the liquid crystal display device of the present embodiment, the directive diffusion plate for the left eye 18 having the diffusion characteristics with respect to the illuminative light for the left eye emitted in the left-eye direction from the plane light source 6, and the directive diffusion plate for the right eye 19 having the diffusion characteristics with respect to the illuminative light for the right eye emitted in the right-eye direction from the plane light source 6 are further disposed between the liquid crystal display panel 1 and the plane light source 6. Therefore, the illuminative light for the right and left eyes emitted from the plane light source 6 are formed in lights which do not have any Moire fringes and whose intensity distribution is uniform. Moreover, the illuminative lights for the right and left eyes can be incident upon the liquid crystal display panel 1, respectively, substantially without changing the directions.

Figure 14:
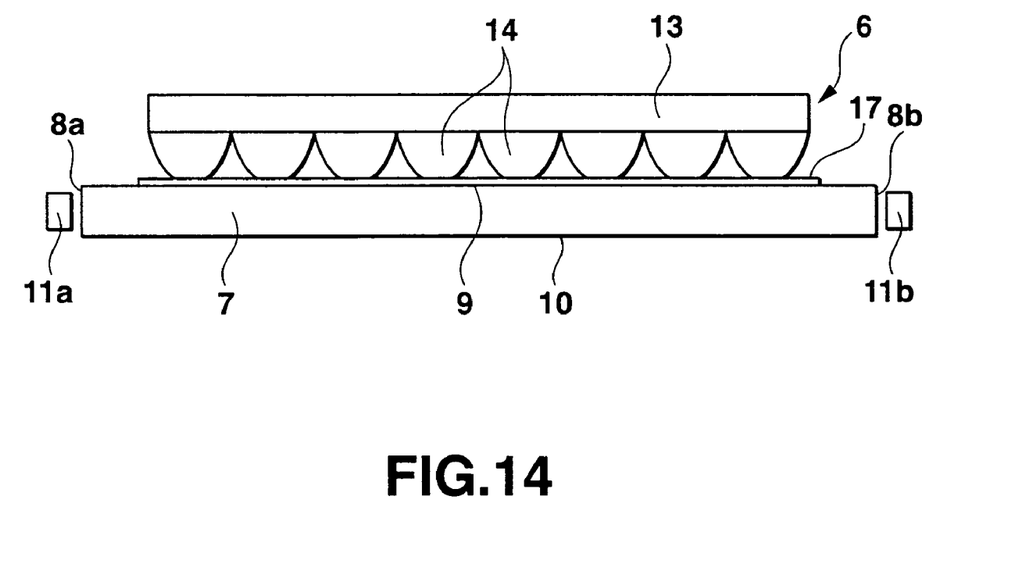
FIG. 14 is a side view of the plane light source showing another embodiment of the present invention.

In the embodiment, the collimating film 12 of the plane light source 6 has a constitution in which the elongated ridges 14 are separated from each other at an interval (distance P2), but the collimating film 12 may also be constituted in such a manner that the elongated ridges 14 are closely arranged as in another embodiment shown in FIG. 14.

Moreover, in the embodiment, the collimating film 12 has a constitution in which the elongated ridges 14 are disposed on the surface facing the light guide plate 7 of the base film 13, but in the collimating film 12, the elongated ridges 14 may also be integrally formed on the surface facing the light guide plate 7 of the transparent film (preferably the transparent film having a refractive index substantially equal to that of the light guide plate 7).

Furthermore, in the liquid crystal display device of the present invention, in addition to the three-dimensional color image, a plane image may also be displayed in a field sequential manner. In this case, the unit color image data of red, green and blue picked up for either of the right and left eyes or by one image pickup lens are successively written into the respective pixels of the liquid crystal display panel 1. The illuminative lights for the right and left eyes having the color corresponding to the written unit color image data may also be emitted from the plane light source 6 in synchronization with the writing of the unit color image data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A three-dimensional liquid crystal display device comprising:

a liquid crystal display panel including a plurality of pixels arranged in a matrix form, wherein color image data of three colors of red, green and blue in color images for right and left eyes for observation separately with the right and left eyes is selectively written in the pixels, and wherein the panel selectively displays color images of three colors of red, green and blue in the color images for the right and left eyes in accordance with the color image data for the right and left eyes;

a plane light source which is disposed on a side opposite to an observation side of the liquid crystal display panel and which emits a first illuminative light of three colors of red, green and blue, having a directivity such that a peak of an emitted light intensity exists in a first direction inclined at a predetermined angle in a direction of one of an observer's right and left eyes with respect to a normal line of the liquid crystal display panel, and a second illuminative light of three colors of red, green and blue, having a directivity such that a peak of an emitted light intensity exists in a second direction inclined at a predetermined angle in a direction of the other one of the observer's right and left eyes with respect to the normal line of the liquid crystal display panel; and a control unit which selects unit color image data of three colors of red, green and blue for displaying the color image for the left eye, and unit color image data of three colors of red, green and blue for displaying the color image for the right eye in a predetermined optional order to successively write the data in the pixels of the liquid crystal display panel in one frame for displaying a three-dimensional image comprising the color images for the right and left eyes, so that, among the first and second illuminative lights, an illuminative light which has color and directivity corresponding to the unit color image data written in each pixel of the liquid crystal display panel is emitted from the plane light source in synchronization with the writing of the unit color image data, wherein the plane light source comprises:

at least two light emitting elements which selectively emit lights of three colors of red, green and blue;

a light guide plate which guides the respective lights emitted by the light emitting elements, the light guide plate having an emission surface from which the light is emitted toward different directions inclined with respect to a normal line of a light guide plate surface; and a collimating film which emits a first one of the lights emitted toward the respective different directions from the light guide plate as the first illuminative light toward the first direction and which emits a second one of the lights as the second illuminative light toward the second direction, and wherein the collimating film comprises a base film and a plurality of elongated ridges formed on a surface of the base film, each of the elongated ridges including: (i) first and second reflective surfaces comprising curved surfaces intersecting with the surface of the base film, and (ii) an incidence surface parallel to the emission surface of the light guide plate and intersecting with the curved surfaces.

2. The three-dimensional liquid crystal display device according to claim 1, wherein adjacent elongated ridges are brought into close contact with each other.

3. The three-dimensional liquid crystal display device according to claim 1, wherein the incidence surface of each of the elongated ridges is closely attached to the emission surface of the light guide plate.

4. The three-dimensional liquid crystal display device according to claim 1, wherein the incidence surface of each of the elongated ridges is bonded to the emission surface of the light guide plate via an adhesive layer.

5. The three-dimensional liquid crystal display device according to claim 1, wherein the elongated ridges of the collimating film are formed of a transparent material whose refractive index is equal to that of the light guide plate.

6. A three-dimensional liquid crystal display device comprising:

a liquid crystal display panel including a plurality of pixels arranged in a matrix form, wherein color image data of three colors of red, green and blue in color images for right and left eyes for observation separately with the right and left eyes is selectively written in the pixels, and wherein the panel selectively displays color images of three colors of red, green and blue in the color images for the right and left eyes in accordance with the color image data for the right and left eyes;

a plane light source which is disposed on a side opposite to an observation side of the liquid crystal display panel and which emits a first illuminative light of three colors of red, green and blue, having a directivity such that a peak of an emitted light intensity exists in a first direction inclined at a predetermined angle in a direction of one of an observer's right and left eyes with respect to a normal line of the liquid crystal display panel, and a second illuminative light of three colors of red, green and blue, having a directivity such that a peak of an emitted light intensity exists in a second direction inclined at a predetermined angle in a direction of the other one of the observer's right and left eyes with respect to the normal line of the liquid crystal display panel; and a control unit which selects unit color image data of three colors of red, green and blue for displaying the color image for the left eye, and unit color image data of three colors of red, green and blue for displaying the color image for the right eye in a predetermined optional order to successively write the data in the pixels of the liquid crystal display panel in one frame for displaying a three-dimensional image comprising the color images for the right and left eyes, so that, among the first and second illuminative lights, an illuminative light which has color and directivity corresponding to the unit color image data written in each pixel of the liquid crystal display panel is emitted from the plane light source in synchronization with the writing of the unit color image data, wherein the plane light source comprises a light guide plate, a collimating film and a light emitting element, wherein the the light guide plate comprises a plate-like transparent member having:
first and second incidence end surfaces which are formed on opposite end surfaces of the transparent member and upon which the light is incident; and
an emission surface which emits the light that is incident upon the first and second incidence end surfaces and that is guided in the transparent member in mutually different directions, wherein the light emitting element comprises first and second light emitting elements which are disposed on sides of the first and second incidence end surfaces of the light guide plate and which produce the lights of three colors of red, green and blue to selectively emit the lights to the incidence end surfaces, and wherein the collimating film comprises an optical film which is disposed to face the emission surface of the light guide plate and which emits the light incident upon the light guide plate via the first incidence end surface and emitted from the emission surface as the first illuminative light having the directivity such that the peak of the emitted light intensity exists in the first direction, and which emits the light incident upon the light guide plate via the second incidence end surface and emitted from the emission surface as the second illuminative light having the directivity such that the peak of the emitted light intensity exists in the second direction.

7. The three-dimensional liquid crystal display device according to claim 6, wherein the control unit writes the unit color image data of red of the color image for the left eye, that of blue of the color image for the right eye, that of green of the color image for the left eye, that of green of the color image for the right eye, that of blue of the color image for the left eye, and that of red of the color image for the right eye in that order into the respective pixels of the liquid crystal display panel, and controls lighting of the light source in accordance with the color of the written unit color image data and the directivity of the written image data in synchronization with the writing.

8. The three-dimensional liquid crystal display device according to claim 6, wherein the control unit writes the unit color image data of red of the color image for the left eye, that of green of the color image for the left eye, that of blue of the color image for the right eye, that of green of the color image for the right eye, that of blue of the color image for the left eye, and that of red of the color image for the right eye in that order into the respective pixels of the liquid crystal display panel, and controls lighting of the light source in accordance with the color of the written unit color image data and the directivity of the written image data in synchronization with the writing.

9. The three-dimensional liquid crystal display device according to claim 6, wherein the liquid crystal display panel comprises:
a pair of substrates on which electrodes are formed;
a liquid crystal layer sealed between the electrodes and twisted/oriented by 90°; and
a pair of polarizing plates disposed on the pair of substrates.

10. The three-dimensional liquid crystal display device according to claim 6, wherein the liquid crystal display panel comprises:
a pair of substrates on which electrodes are formed;
a liquid crystal layer sealed between the electrodes and homogeneously oriented without being twisted/oriented; and
a pair of polarizing plates disposed on the pair of substrates.

11. The three-dimensional liquid crystal display device according to claim 6, further comprising:
a first directive diffusion plate having diffusion characteristics with respect to the first illuminative light emitted in the first direction from the plane light source; and
a second directive diffusion plate having diffusion characteristics with respect to the second illuminative light emitted in the second direction from the plane light source.

12. A three-dimensional liquid crystal display device comprising:
a liquid crystal display panel including a plurality of pixels arranged in a matrix form to selectively display images for right and left eyes for observation separately with the right and left eyes;
a plane light source which is disposed on a side opposite to an observation side of the liquid crystal display panel, the light source emitting first and second illuminative lights, the first illuminative light having a directivity such that a peak of an emitted light intensity exists in a first direction inclined at a predetermined angle in a direction of one of an observer's right and left eyes with respect to a normal line of the liquid crystal display panel, and the second illuminative light having a directivity such that a peak of an emitted light intensity exists in a second direction inclined at a predetermined angle in a direction of the other one of the observer's right and left eyes with respect to the normal line of the liquid crystal display panel; and
a control unit which successively selects image data for the left eye for displaying an image for the left eye and image data for the right eye for displaying an image for the right eye to write the data into each pixel of the liquid crystal display panel, so that the first and second illuminative lights, which have the directivities corresponding to the data for the right and left eyes written in the respective pixels of the liquid crystal display panel, are selectively emitted from the plane light source in synchronization with the display of the liquid crystal display panel by the writing of the image data,
wherein the plane light source comprises:
a plurality of light emitting elements;
a light guide plate which guides at least two lights produced by the light emitting elements to emit the light from a light guide plate surface toward different directions inclined with respect to a normal line of the light guide plate surface; and
a collimating film which emits one of the at least two lights emitted toward the respective different directions from the light guide plate as the first illuminative light toward the first direction, and which emits the other light of the at least two lights as the second illuminative light toward the second direction,
wherein the light guide plate comprises a plate-like transparent member having first and second incidence end surfaces which are formed on opposite end surfaces of the transparent member and upon which the light is incident, and an emission surface to emit the light which is incident upon the first and second incidence end surfaces and which is guided in the transparent member in mutually different directions, wherein the light emitting elements include first and second light emitting elements which are disposed to respectively face the first and second incidence end surfaces of the transparent member and which selectively emit the light toward the respective incidence end surfaces, and wherein the collimating film comprises an optical film which is disposed on the emission surface of the transparent member and which emits the light incident upon the light guide plate via the first incidence end surface and emitted from the emission surface as the first illuminative light having the directivity such that the peak of emitted light intensity exists in the first direction and which emits the light incident upon the light guide plate via the second incidence end surface and emitted from the emission surface as the second illuminative light having the directivity such that the peak of emitted light intensity exists in the second direction.

13. A three-dimensional liquid crystal display device comprising:

a liquid crystal display panel including a plurality of pixels arranged in a matrix form, wherein color image data of three colors of red, green and blue in color images for right and left eyes for observation separately with the right and left eyes is selectively written in the pixels, and wherein the panel selectively displays color images of three colors of red, green and blue in the color images for the right and left eyes in accordance with the color image data for the right and left eyes;

a plane light source which is disposed on a side opposite to an observation side of the liquid crystal display panel and which emits a first illuminative light of three colors of red, green and blue, having a directivity such that a peak of an emitted light intensity exists in a first direction inclined at a predetermined angle in a direction of one of an observer's right and left eyes with respect to a normal line of the liquid crystal display panel, and a second illuminative light of three colors of red, green and blue, having a directivity such that a peak of an emitted light intensity exists in a second direction inclined at a predetermined angle in a direction of the other one of the observer's right and left eyes with respect to the normal line of the liquid crystal display panel; and a control unit which selects unit color image data of three colors of red, green and blue for displaying the color image for the left eye, and unit color image data of three colors of red, green and blue for displaying the color image for the right eye in a predetermined optional order to successively write the data in the pixels of the liquid crystal display panel in one frame for displaying a three-dimensional image comprising the color images for the right and left eyes, so that, among the first and second illuminative lights, an illuminative light which has color and directivity corresponding to the unit color image data written in each pixel of the liquid crystal display panel is emitted from the plane light source in synchronization with the writing of the unit color image data, wherein the plane light source comprises:

at least two light emitting elements which selectively emit lights of three colors of red, green and blue;

a light guide plate which guides the respective lights emitted by the light emitting elements, the light guide plate having an emission surface from which the light is emitted toward different directions inclined with respect to a normal line of a light guide plate surface; and a collimating film which emits a first one of the lights emitted toward the respective different directions from the light guide plate as the first illuminative light toward the first direction and which emits a second one of the lights as the second illuminative light toward the second direction, wherein the collimating film includes a plurality of elongated ridges that are disposed in parallel with first and second incidence end surfaces of the light guide plate and that are on a side facing the light guide plate, each of the plurality of elongated ridges including:

an incidence surface which faces the emission surface of the light guide plate to introduce the light emitted in mutually different directions from the emission surface of the light guide plate;

a first reflective surface which reflects the first one of the lights of the mutually different directions, introduced from the incidence surface, in the first direction; and a second reflective surface which reflects the second one of the lights having the different directions, introduced from the incidence surface, in the second direction.

14. A three-dimensional liquid crystal display device comprising:

a liquid crystal display panel including a plurality of pixels arranged in a matrix form, wherein color image data of three colors of red, green and blue in color images for right and left eyes for observation separately with the right and left eyes is selectively written in the pixels, and wherein the panel selectively displays color images of three colors of red, green and blue in the color images for the right and left eyes in accordance with the color image data for the right and left eyes;

a plane light source which is disposed on a side opposite to an observation side of the liquid crystal display panel and which emits a first illuminative light of three colors of red, green and blue, having a directivity such that a peak of an emitted light intensity exists in a first direction inclined at a predetermined angle in a direction of one of an observer's right and left eyes with respect to a normal line of the liquid crystal display panel, and a second illuminative light of three colors of red, green and blue, having a directivity such that a peak of an emitted light intensity exists in a second direction inclined at a predetermined angle in a direction of the other one of the observer's right and left eyes with respect to the normal line of the liquid crystal display panel; and a control unit which selects unit color image data of three colors of red, green and blue for displaying the color image for the left eye, and unit color image data of three colors of red, green and blue for displaying the color image for the right eye in a predetermined optional order to successively write the data in the pixels of the liquid crystal display panel in one frame for displaying a three-dimensional image comprising the color images for the right and left eyes, so that, among the first and second illuminative lights, an illuminative light which has color and directivity corresponding to the unit color image data written in each pixel of the liquid crystal display panel is emitted from the plane light source in synchronization with the writing of the unit color image data, wherein the control unit writes the unit color image data of three colors of red, green and blue of the color image for the left eye and that of three colors of red, green and blue of the color image for the right eye in that order into the respective pixels of the liquid crystal display panel, and controls lighting of the light source in accordance with the color of the written unit color image data and the directivity of the written image data in synchronization with the writing.

15. A three-dimensional liquid crystal display device comprising:

a liquid crystal display panel including a plurality of pixels arranged in a matrix form, wherein color image data of three colors of red, green and blue in color images for right and left eyes for observation separately with the right and left eyes is selectively written in the pixels, and wherein the panel selectively displays color images of three colors of red, green and blue in the color images for the right and left eyes in accordance with the color image data for the right and left eyes;

a plane light source which is disposed on a side opposite to an observation side of the liquid crystal display panel and which emits a first illuminative light of three colors of red, green and blue, having a directivity such that a peak of an emitted light intensity exists in a first direction inclined at a predetermined angle in a direction of one of an observer's right and left eyes with respect to a normal line of the liquid crystal display panel, and a second illuminative light of three colors of red, green and blue, having a directivity such that a peak of an emitted light intensity exists in a second direction inclined at a predetermined angle in a direction of the other one of the observer's right and left eyes with respect to the normal line of the liquid crystal display panel; and a control unit which selects unit color image data of three colors of red, green and blue for displaying the color image for the left eye, and unit color image data of three colors of red, green and blue for displaying the color image for the right eye in a predetermined optional order to successively write the data in the pixels of the liquid crystal display panel in one frame for displaying a three-dimensional image comprising the color images for the right and left eyes, so that, among the first and second illuminative lights, an illuminative light which has color and directivity corresponding to the unit color image data written in each pixel of the liquid crystal display panel is emitted from the plane light source in synchronization with the writing of the unit color image data, wherein the control unit writes the unit color image data of red of the color image for the left eye, that of red of the color image for the right eye, that of green of the color image for the left eye, that of green of the color image for the right eye, that of blue of the color image for the left eye, and that of blue of the color image for the right eye in that order into the respective pixels of the liquid crystal display panel, and controls lighting of the light source in accordance with the color of the written unit color image data and the directivity of the written image data in synchronization with the writing.

16. A three-dimensional liquid crystal display device comprising:

a liquid crystal display panel including a plurality of pixels arranged in a matrix form, wherein color image data of three colors of red, green and blue in color images for right and left eyes for observation separately with the right and left eyes is selectively written in the pixels, and wherein the panel selectively displays color images of three colors of red, green and blue in the color images for the right and left eyes in accordance with the color image data for the right and left eyes;

a plane light source which is disposed on a side opposite to an observation side of the liquid crystal display panel and which emits a first illuminative light of three colors of red, green and blue, having a directivity such that a peak of an emitted light intensity exists in a first direction inclined at a predetermined angle in a direction of one of an observer's right and left eyes with respect to a normal line of the liquid crystal display panel, and a second illuminative light of three colors of red, green and blue, having a directivity such that a peak of an emitted light intensity exists in a second direction inclined at a predetermined angle in a direction of the other one of the observer's right and left eyes with respect to the normal line of the liquid crystal display panel;

a control unit which selects unit color image data of three colors of red, green and blue for displaying the color image for the left eye, and unit color image data of three colors of red, green and blue for displaying the color image for the right eye in a predetermined optional order to successively write the data in the pixels of the liquid crystal display panel in one frame for displaying a three-dimensional image comprising the color images for the right and left eyes, so that, among the first and second illuminative lights, an illuminative light which has color and directivity corresponding to the unit color image data written in each pixel of the liquid crystal display panel is emitted from the plane light source in synchronization with the writing of the unit color image data; and at least one directive diffusion plate which is disposed between the liquid crystal display panel and the plane light source and which has diffusion characteristics with respect to the light incident from a predetermined direction.

* * * * *